United States Patent
Backer et al.

(10) Patent No.: US 11,230,616 B2
(45) Date of Patent: Jan. 25, 2022

(54) CHLORIDE-FREE CATIONIC POLYMERS USING ACETATE ANIONS

(71) Applicants: Rohm and Haas Company, Collegeville, PA (US); Union Carbide Corporation, Seadrift, TX (US)

(72) Inventors: Scott Backer, Phoenixville, PA (US); James Pawlow, Aurora, OH (US); Muhunthan Sathiosatham, Chalfont, PA (US); Eric Wasserman, Collegeville, PA (US)

(73) Assignees: Rohm and Haas Company, Collegeville, PA (US); Union Carbide Corporation, Seadrift, TX (US)

(*) Notice: Subject to any disclaimer, the term of this patent is extended or adjusted under 35 U.S.C. 154(b) by 69 days.

(21) Appl. No.: 16/632,454

(22) PCT Filed: Jun. 20, 2018

(86) PCT No.: PCT/US2018/038411
§ 371 (c)(1),
(2) Date: Jan. 20, 2020

(87) PCT Pub. No.: WO2019/022868
PCT Pub. Date: Jan. 31, 2019

(65) Prior Publication Data
US 2021/0147596 A1    May 20, 2021

Related U.S. Application Data

(60) Provisional application No. 62/535,992, filed on Jul. 24, 2017.

(51) Int. Cl.
| | | |
|---|---|---|
| C08F 20/34 | (2006.01) | |
| C08F 116/14 | (2006.01) | |
| C08F 120/14 | (2006.01) | |
| C08F 120/28 | (2006.01) | |
| C08F 216/14 | (2006.01) | |
| C11D 3/37 | (2006.01) | |
| C08F 22/22 | (2006.01) | |
| C08F 26/02 | (2006.01) | |
| C08F 20/36 | (2006.01) | |
| C08F 220/34 | (2006.01) | |
| C08F 220/28 | (2006.01) | |

(52) U.S. Cl.
CPC .............. *C08F 20/34* (2013.01); *C08F 20/36* (2013.01); *C08F 22/22* (2013.01); *C08F 26/02* (2013.01); *C08F 116/14* (2013.01); *C08F 120/14* (2013.01); *C08F 120/28* (2013.01); *C08F 216/1458* (2013.01); *C11D 3/3769* (2013.01); *C08F 216/1416* (2013.01); *C08F 220/281* (2020.02); *C08F 220/283* (2020.02); *C08F 220/346* (2020.02); *C11D 3/3776* (2013.01)

(58) Field of Classification Search
CPC .... C08F 220/34; C08F 220/36; C08F 226/02; C08F 226/22; C08F 22/22; C08F 122/22; C08F 20/34; C08F 20/36; C08F 120/34; C08F 120/36; C08F 26/02; C08F 126/02
See application file for complete search history.

(56) References Cited

U.S. PATENT DOCUMENTS

| | | | |
|---|---|---|---|
| 3,288,770 A | | 11/1966 | Butler |
| 3,671,502 A | | 6/1972 | Samour et al. |
| 5,232,622 A | | 8/1993 | Jones et al. |
| 5,834,098 A | * | 11/1998 | Kitamura ............... B32B 27/34 428/195.1 |
| 6,191,098 B1 | | 2/2001 | Rodrigues et al. |
| 6,660,711 B1 | | 12/2003 | Price et al. |
| 7,793,601 B2 | | 9/2010 | Davison |
| 8,791,271 B2 | | 7/2014 | Siemer et al. |
| 8,858,803 B2 | | 10/2014 | Guliashvili et al. |
| 9,017,652 B1 | | 4/2015 | Askar et al. |

FOREIGN PATENT DOCUMENTS

| | | | |
|---|---|---|---|
| EP | 112592 | A2 | 7/1984 |
| EP | 1221475 | B1 | 11/2005 |
| EP | 1967545 | | 9/2008 |
| GB | 2104091 | | 3/1983 |
| JP | 2014100882 | | 6/2014 |
| JP | 2015140341 | A * | 8/2015 |
| WO | 2007089001 | | 8/2007 |
| WO | 2013033275 | | 3/2013 |
| WO | 2019022865 | | 1/2019 |
| WO | 2019022866 | | 1/2019 |
| WO | 2019022868 | | 1/2019 |
| WO | 2019022869 | | 1/2019 |

OTHER PUBLICATIONS

Lindner, Jean-Pierre, "Imidazolium-Based Polymers via the Poly-Radziszewski Reaction," Macromolecules, 2016, p. 2046-2053, vol. 49.

Parrott, R., et al., "Chloride stress corrosion cracking in austenitic stainless steel," Health and Safety Executive of the U.K., 2011, p. 1-53, RR902.

* cited by examiner

*Primary Examiner* — Ling Siu Choi
*Assistant Examiner* — David L Miller
(74) *Attorney, Agent, or Firm* — Steven W. Mork

(57) ABSTRACT

A composition contains ethylenically unsaturated quaternary ammonium cations with acetate counterions, where each of the ethylenically unsaturated ammonium cations contain only one non-aromatic carbon-carbon double bond and the composition contains less than one mole-percent chloride relative to quaternary ammonium cations can be polymerized to form a cationic polymer acetate.

3 Claims, No Drawings

CHLORIDE-FREE CATIONIC POLYMERS USING ACETATE ANIONS

BACKGROUND OF THE INVENTION

Field of the Invention

The present invention relates to a polymerizable cationic monomer with acetate counterions that are suitable for polymerizing into a substantially chloride-free, even substantially halogen-free cationic polymers.

INTRODUCTION

Cationic polymers, particularly polymers containing quaternary ammonium functionalities, are useful in detergent formulations including automatic dishwashing detergent formulations and laundry detergent formulations. Quaternary ammonium compounds can be useful to modify a range of properties from spotting on dishes to static charge in clothing.

Preparing cationic polymers, particularly quaternary ammonium polymers, typically requires polymerization of a monomeric cationic chloride salt. The presence of chloride in such a process is problematic. Free chloride is corrosive to metal, including the metal typically used for polymerization reactors. Therefore, the reactors used for synthesis of cationic polymers must be regularly monitored for wear and must be regularly repaired or they must be glass-lined or made of special chloride-resistant alloy. It is desirable to be able to prepare cationic polymers without having the problems associated with chloride counterions so less expensive steel reactors can be used without degradation caused by the presence of chloride.

Similarly, use of cationic polymers comprising chloride ions can be harmful to metal components exposed to the chloride ions. For example, use of a cationic polymer in an automatic dishwasher detergent exposes the polymer to the metallic components inside the dishwasher. Chloride ions present with the cationic polymer can corrode and degrade the metal components of the dishwasher, which is undesirable. Therefore, cationic polymers that are substantially free of chloride ions, or any halide ions, are desirable, particularly cationic polymers that are suitable for use in detergent formulations for laundry and/or automatic dishwashing applications.

BRIEF SUMMARY OF THE INVENTION

The present invention provides a solution to the problem of preparing cationic polymers in an absence of chloride ions to provide a cationic polymer that can be free of chloride ions or any halogen ions.

Surprisingly, the present invention is a result of discovering a way to prepare a composition containing monomeric cations having acetate counterions (or "monomeric cation acetate" for short) that can be polymerized to form cationic polymers with acetate counterions. Chloride, or any halide, can be present at less than one mole-percent (mol %) relative to total moles of cationic monomer: (i) in the cationic monomers; (ii) during the polymerization to form cationic polymers; and/or (iii) in the cationic polymers. Chloride, or any halide, can also be absent from the cationic monomers, during polymerization and in the cationic polymers. Compositions comprising the monomeric cation acetate can be "substantially free" of chloride or any halide, which means the composition can contain one weight-percent or less chloride or any halide based on composition weight and can actually be free of chloride or any other halide. In fact, compositions of the present invention can be substantially free of chloride or any halide without having to treat the composition to remove halide.

In a first aspect, the present invention is a method for producing a cationic polymer from a composition comprising ethylenically unsaturated quaternary ammonium cations with acetate counterions where each of the ethylenically unsaturated ammonium cations contain only one non-aromatic carbon-carbon double bond and the composition contains less than one mole-percent chloride relative to quaternary ammonium cations, the method comprising polymerizing the ethylenically unsaturated quaternary ammonium cation by free radical polymerization of the carbon-carbon double bond so as to produce a cationic polymer having quaternary ammonium pendant functionalities with acetate counterions.

In a second aspect, the present invention is a cationic polymer having multiple quaternary ammonium pendant functionalities with acetate counterions. The cationic polymer is obtainable by the process of the first aspect.

The composition comprising monomeric cations is useful for polymerizing to form cationic polymers in a substantial absence of chloride.

DETAILED DESCRIPTION OF THE INVENTION

"And/or" means "and, or alternatively". Ranges include endpoints unless otherwise stated.

In one aspect, the present invention provides a composition that comprises of cationic monomers having acetate counterions. A cationic monomer contains a cationic moiety and an ethylenic unsaturated moiety in a single covalently bonded molecule. Typically, and desirably, there is a single cationic functionality on each cationic monomer. The monomers are ethylenic unsaturated, which means each monomer has a non-aromatic carbon-carbon double bond (an ethylenically unsaturated moiety). Desirably, each cationic monomer has only one non-aromatic carbon-carbon double bond. Multiple non-aromatic carbon-carbon double bounds can be undesirable because they tend to result in crosslinking during polymerization. Upon initiating polymerization, the non-aromatic carbon-carbon double bonds of the cationic monomers copolymerize thereby forming a polymer with pendant cationic functionalities extending from the polymer backbone.

The cationic monomer has an acetate counterion. The counterion is desirably free from (that is, not covalently bound to) the cationic monomer.

As counterions, the acetate associates with the cationic monomer to establish electronic neutrality. It is desirable for each cationic functionality of the cationic monomers to have an acetate as a counterion. In that regard, there are ideally equal molar amounts of cationic functionalities from the cationic monomers as there are acetate anions. For the sake of the present invention, it is desirable for there to be 1:0.9 to 1:1.1 molar ratio, preferably a 1:0.95 to 1:1.05 molar ratio, and even more preferably 1:1 molar ratio of anionic functionalities of acetate anions to cationic functionalities of cationic monomers in the composition of the present invention at a pH of 8. The acetate is assumed to serve as a counterion to the cationic monomer when any of these molar ratios are met.

Determine the molar ratio of cationic functionalities and acetate ions from the identity and concentration of cationic monomers and acetate anions added to the composition. If the identity and concentration of the cationic monomers and/or acetate ions are unknown, experimentally determine the molar ratio of acetate anions to cationic functionalities by isolating two samples of the composition comprising the cationic monomers and acetate counterions, adding a quantitative nonionic internal standard to each, running one through a cationic ion exchange column and the other through an anionic ion exchange column and then quantitatively determining the concentration of cationic monomer and acetate counterions in each using nuclear magnetic resonance (NMR) spectroscopy.

The cationic monomers can be polymerized to form cationic polymers, preferably in an environment that is free from chloride ions, free from halide ions and/or free from any anionic counterions other than acetate anions. Especially desirably, the cationic polymers can be made in an environment that is free from chloride, or any halide.

Chloride and other halides are unnecessary in the composition of the present invention. Halides, particularly chloride, are often present as counterions to a cationic functionalities. The present invention obviates a need for halide counterions by including anionic monomers. As a result, the compositions of the present invention can have less than one mole-percent (mol %), preferably 0.5 mol % or less, more preferably 0.1 mol % or less and most preferably is free of chloride. Moreover, the compositions of the present invention can have less than one mole-percent (mol %) halide, preferably 0.5 mol % or less, more preferably 0.1 mol % or less and most preferably is free of any halide. Mol % chloride and halide is relative to total moles of cationic functionalities that are part of the cationic monomers. Determine mol % chloride and mol % halide by ion chromatography in which a test solution is passed through a column and the concentration of chloride (or other halide) ion is measured by the area under a peak whose elution time corresponds to that observed in a run of a calibration solution containing known levels of chloride (or other halide) ion. Detection is desirably done by suppressed conductivity.

The cationic monomer is desirably selected from a group consisting of unsaturated quaternary ammonium cations. In quaternary ammonium cations the quaternary ammonium nitrogen containing group is the cationic functionality. Preferably, the cationic monomer is an unsaturated quaternary ammonium cation having the structure of Formula I:

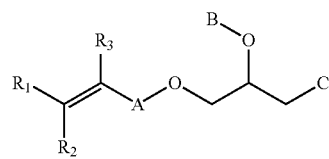
(I)

where: $R_1$, $R_2$ and $R_3$ are independently selected from a group consisting of hydrogen, methyl and ethyl; A is selected from a group consisting of

(or, "$CH_2$" for short) and

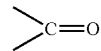

(or "C=O" for short), B is selected from a group consisting of hydrogen, an acetoyl group, and a propionyl group; and C has a structure of one structure selected from a group consisting of Formula II and Formula III, where Formula II is

(II)

where $R_4$, $R_5$ and $R_6$ are independently selected from a group consisting of $C_1$-$C_{12}$ alkyl or arylalkyl groups; and Formula III is

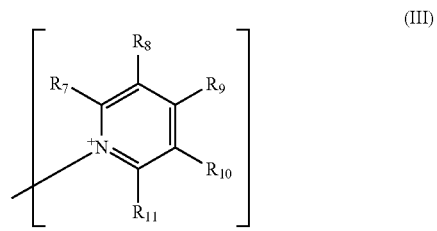
(III)

where $R_7$-$R_{11}$ are independently selected from a group consisting of hydrogen and $C_1$-$C_{12}$ alkyl groups. The groups of Formula II and Formula III are the quaternary ammonium cationic groups. Quaternary ammonium cations are understood herein to be groups with a cationic nitrogen having attached to the cationic nitrogen four carbon-nitrogen bonds. As in Formula III, an aromatic double bond between the nitrogen cation and a carbon serves as two carbon-nitrogen bonds.

One desirable unsaturated quaternary ammonium cation of Formula I has $R_1$, $R_2$ and $R_3$ all hydrogens, A is $CH_2$, B is hydrogen and C is Formula II where each of $R_4$, $R_5$ and $R_6$ are —$CH_3$ groups.

Another desirable unsaturated quaternary ammonium cation of Formula I has $R_1$ and $R_2$ are hydrogens, $R_3$ is —$CH_3$, A is C=O, B is hydrogen and C is Formula II where each of $R_4$, $R_5$ and $R_6$ are —$CH_3$ groups.

Yet another desirable unsaturated quaternary ammonium cation of Formula I has $R_1$, $R_2$ and $R_3$ all hydrogens, A is $CH_2$, B is hydrogen and C is Formula III where each of $R_7$, $R_8$, $R_9$, $R_{10}$ and $R_{11}$ are hydrogen.

It is desirable to directly synthesize the cationic monomer directly with the acetate counterion. In that manner, the process can avoid having to replace a counterion on the cationic monomer with acetate. As a result of such a desirable direct synthesis, there is a substantial absence of chloride ions and/or other halide ions and/or any anions present other than other than acetate present in the composition of the present invention to compete with acetate as a counterion to the cationic monomer. A "substantial absence" in this regard means that there is a less than 10 mol %, preferably 8 mol % or less, more preferably 5 mol % or less, even more preferably 3 mol % or less, yet more preferably 2 mol % or less, yet even more preferably one mol % or less and most preferably zero mol % (an absence of) chloride ions and/or other halide ions and/or any anions present other than the anionic monomer counterion in the composition of the present invention wherein mol % is relative to total moles of cationic functionalities in the composition.

Generally, the composition comprises the cationic monomers and acetate anions dispersed or dissolved in a solvent such a water. Solvent is generally 90 wt % or less, preferably 80 wt % or less, still more preferably 70 wt % or less, and can be 60 wt % or less, 50 wt % or less, 40 wt % or less, 30 wt % or less, 20 wt % or less, 10 wt % or less, 5 wt % or less and even zero wt % of the total composition weight. At the same time, solvent can be present at a concentration of greater than zero wt %, 5 wt % or more, 10 wt % or more, 20 wt % or more, 30 wt % or more, 40 wt % or more, 50 wt % or more, 60 wt % or more, 70 wt % or more, 80 wt % or more and even 90 wt % or more based on total weight of the composition.

The composition desirably comprises 70 wt % or more, preferably 75 wt % or more, and can be 80 wt % or more, 85 wt % or more, 90 wt % or more, 95 wt % or more and even 100 wt % of a combination of the cationic monomers and acetate anions relative total solids weight of the composition. At the same time, the combination of cationic monomers and acetate anions can be less than 100 wt %, 95 wt % or less, 90 wt % or less, 85 wt % or less, 80 wt % or less, even 75 wt % or less of the total solids weight of the composition. Solids weight refers to the weight of components other than a solvent (for example, water). Other solids that can be present in the composition include organic components other than the cationic monomers and acetate anions as well as inorganic materials such as impurities, salts and minerals.

The composition of the present invention is useful for preparing cationic polymers having pendant cationic functionalities with acetate counterions. In a second aspect, the present invention is a method for producing cationic polymers from the composition of the present invention by polymerizing the ethylenically unsaturated cationic monomer by free radical polymerization of the non-aromatic carbon-carbon double bonds so to produce a cationic polymer having cationic pendant functionalities with acetate counterions. Such a polymerization directly prepares such a polymer without need for any counterion exchange to obtain the acetate counterion.

In general, the method for free radical polymerization of the monomer of the composition of the present invention occurs through reaction of the monomers with free radicals, typically generated thermally or electrochemically from "initiators". For example, monomer and initiator can be simultaneously and continuously fed into a reactor containing solvent while maintaining the temperature of the reactor through heat removal. Initiator is generally fed in such a manner that the concentration of residual monomers present at the completion of the reaction process are minimized.

Preferably, after completing the polymerization to form the cationic polymer, the composition comprises less than one mol % of non-polymerized cationic monomer, even more preferably 0.5 mol % or less, even more preferably 0.1 mol % or less and most zero mol % non-polymerized cationic monomer (residual cationic monomer), with mol % of cationic monomer relative to total moles of polymerized and non-polymerized cationic monomer. Measure the residual monomer concentration by gas chromatography if the monomer is volatile and by liquid chromatography is the monomer is non-volatile.

The resulting cationic polymer has a carbon chain backbone with pendant cationic functionalities. The pendant cationic functionalities can be pendant side chains or pendant side groups, meaning the cationic functionalities can be part of either a pendant side chain or a pendant side group of the cationic polymer. A "pendant side chain" is an oligomeric or polymeric extension off from a backbone while a "pendant side group" is an extension off from a backbone that is neither oligomeric nor polymeric. For simplicity herein, the term "pendant functionality" will be used to generally refer to the pendant cationic functionality and/or pendant anionic functionality. For avoidance of doubt, pendant functionalities are covalently bound the polymer backbone.

Desirably the cationic polymer comprises less than 10 mole-percent (mol %), preferably 8 mol % or less, more preferably 5 mol % or less, even more preferably 3 mol % or less, yet more preferably 2 mol % or less, yet even more preferably one mol % or less, 0.5 mol % or less, 0.1 mol % or less and most preferably zero mol % (an absence of) chloride ions and/or halide ions and/or any free anions other than acetate anions, wherein mol % is relative to total moles of pendant cationic functionalities in the cationic polymer. In this regard, the cationic polymer avoids application challenges associated with chloride and other halides. Determine wt % halide by ion chromatography.

Desirably, compositions comprising the cationic monomer and acetate counterion comprise less than one wt % chloride, preferably less than one wt % of any halide relative to total composition weight. Determine wt % halide by ion chromatography.

Determine moles of pendant cationic functionalities by assuming 100% incorporation of the monomers into cationic polymer with an equal distribution of monomers among all of the cationic polymers. Determine concentration of halides using x-ray fluorescence spectrometry.

Desirably, the pendant cationic functionality on the cationic polymer is a pendant quaternary ammonium functionality. Preferably, the pendant cationic functionality has the structure of Formula IV (the portion shown in brackets) with A attached to the backbone (represented by the curved line) of the polymer:

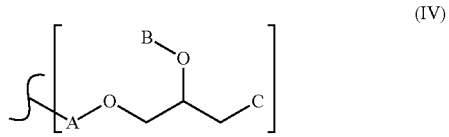

where A is selected from a group consisting of

(or, "CH$_2$" for short) and

(or "C=O" for short), B is selected from a group consisting of hydrogen, an acetoyl group, and a propionyl group; and C is selected from a group consisting of Formula II and Formula III.

One desirable pendant quaternary ammonium functionality of Formula IV has $R_1$, $R_2$ and $R_3$ all hydrogens, A is $CH_2$, B is hydrogen and C is Formula II where each of $R_4$, $R_5$ and $R_6$ are —$CH_3$ groups.

Another desirable pendant quaternary ammonium functionality of Formula IV has $R_1$ and $R_2$ are hydrogens, $R_3$ is —$CH_3$, A is C=O, B is hydrogen and C is Formula II where each of $R_4$, $R_5$ and $R_6$ are —$CH_3$ groups.

Yet another desirable pendant quaternary ammonium functionality of Formula IV has $R_1$, $R_2$ and $R_3$ all hydrogens, A is $CH_2$, B is hydrogen and C is Formula III where each of $R_7$, $R_8$, $R_9$, $R_{10}$ and $R_{11}$ are hydrogen.

Desirably, the cationic polymer obtainable by polymerizing the monomers in the composition of the present invention has a weight-average molecular weight of 2000 daltons or more, and can be 3000 daltons or more, 5000 daltons or more 10,000 daltons or more 20,000 daltons or more 30,000 daltons or more, 40,000 daltons or more, 50,000 daltons or more, 60,000 daltons or more, 70,000 daltons or more and even 80,000 daltons or more while at the same time is generally 100,000 daltons or less and can be 90,000 daltons or less, 80,000 daltons or less, 70,000 daltons or less, 60,000 daltons or less, 50,000 daltons or less, 40,000 daltons or less and even 30,000 daltons or less. Determine weight-average molecular weight of the cationic polymer by gel permeation chromatography.

The cationic polymer of the present invention is useful in detergent formulations including automatic dishwashing detergents and laundry detergents. Exemplary automatic dishwashing detergents can comprise 0.5-10 wt % cationic polymer, 20-60 wt % inorganic builder and 1-10 wt % nonionic surfactant. Exemplary laundry detergents can comprise 0.5-10 wt % cationic polymer, 1-30 wt % anionic surfactant and 1-10 wt % nonionic surfactant.

EXAMPLES

Synthesis of Cationic Monomer/Acetate Counterion Pair

Example 1: Synthesis of 3-(allyloxy)-2-hydroxy-N,N,N-trimethylpropan-1-aminium acetate Equip a one-liter round bottom flask with an overhead stirrer, a dry ice condenser and a temperature probe. Introduce into the round bottom flask 199 g of a 29.9 wt % aqueous trimethylamine (TMA) solution (59.1.5 g, 1.01 mol actives). Immerse the flask in an ice bath until the solution temperature reaches 4° C. Add 60.4 g (1.01 mol) glacial acetic acid dropwise to the flask contents over one hour. Maintain the temperature through the addition between 4-8° C. The resulting aminium salt solution is clear and colorless. Add 0.5 g of 4-hydroxy-2,2,6,6-tetramethylpiperidin-1-oxyl (4-hydroxy-TEMPO or 4-HT) inhibitor and stir the solution for an additional 30 minutes. Remove the ice bath and allow to gradually warm to 20° C. The resulting solution is clear and slightly orange. Replace the ice bath with a heating mantle and set the temperature to 45° C. When the solution temperature reaches 42.5° C. add 114 g (1.00 mol) of allyl glycidyl ether (AGE) dropwise over 90 minutes. Maintain the temperature at 48.5-56° C. during addition. After addition is complete, the solution temperature rises rapidly reaching 71° C. within 10 minutes. Replace the heating mantle with a water bath to cool the mixture. Allow the temperature of the solution to decrease to 50° C. over 15 minutes. The solution become clear and monophasic. The product, Example 1, is 58 wt % solids.

Quantitative analyze by NMR by dissolving a sample of the reaction mixture in D20 indicates that the product mixture contains three primary species: 94.4 mol % 3-(allyloxy)-2-hydroxy-N,N,N-trimethylpropan-1-aminium acetate; 3.3 mol % 3-(allyloxy)-2-hydroxypropyl acetate; and 2.4 mol % hydrolysis byproduct 3-(allyloxy)propane-1,2-diol.

Example 2: Synthesis of 2-hydroxyl-3-(methacryloyloxy)-N,N,N-trimethylpropan-1-aminium acetate Equip a two-liter 4-necked round bottom flask with a full jacket, dry ice condenser, temperature probe and an overhead stirrer. Add 203 g of aqueous TMA solution (30.05 wt % in water, 1.03 mol active). Set the jacket temperature to one ° C. and the overhead stirrer to 240 revolutions per minute. Add 60.4 g (1.00 mol) of glacial acetic acid dropwise over one hour. Maintain the temperature between 4-6° C. during the addition. The resulting solution is clear and colorless. Add 0.06 g of 4-HT inhibitor and stir for 60 minutes while slowly heating to 39° C. Add 146 g (1.03 mol) glycidyl methacrylate (GMA) dropwise to the solution over 2.5 hours while maintaining the solution temperature between 40-42° C. 90 minutes after addition was complete the solution is clear indicates that the reaction of GMA is complete. Maintain a temperature of 40° C. for an additional 15 minutes and then allow to cool to 23° C. The resulting solution, Example 2, is 65.4 wt % solids.

Conduct NMR analysis by dissolving some reaction mixture into D20. The product mixture is approximately 85 mol % 2-hydroxyl-3-(methacryloyloxy)-N,N,N-trimethylpropan-1-aminium acetate; 3.4 mol % 3-acetoxy-2-hydroxypropyl methacrylate; 5.6 mol % 2,3-hydroxypropyl methacrylate; 3.4 mol % 2,3-dihydroxy-N,N,N-trimethylpropan-1-aminium methacrylate and 2.5 mol % unidentified byproduct.

Polymerization to form Cationic Polymer Acetate

Example 3: Polymerization of Example 1 to Form Cationic Polymer Acetate

Equip a round-bottom flask with an overhead stirrer, thermocouple, nitrogen bubbler, reflux condenser, syringe pumps and reciprocating pumps. Charge the flask with 137.5 g of deionized water, 68.96 g of the 58 wt % aqueous solution product of Example 1 containing primarily 3-(allyloxy)-2-hydroxy-N,N,N-trimethylpropan-1-aminium acetate, and 1.66 g of a 0.15 wt % solution of iron (II) sulfate in deionized water. Raise the temperature of the resulting solution in the flask to 72° C. using a heating mantle. Pour directly into the flask a solution of 4.15 g of a 15.7 wt % solution of sodium metabisulfite (SMBS) in deionized water. Simultaneously begin three feeds into the flask: (a) a solution of 0.73 g sodium persulfate in 15 g deionized water; (b) a solution of 14.7 g SMBS in 30 g deionized water; and (c) 160 g glacial acrylic acid. Feed (a) into the flask over 95 minutes, (b) over 80 minutes and (c) over 90 minutes. Maintain the solution temperature in the flask at 73° C. during the feeds. After completing the feeds, maintain the solution at 73° C. for an addition 10 minutes. Add a solution of 0.265 g sodium persulfate in 3.5 g deionized water over 10 minutes and then hold at 75° C. for another 20 minutes. Allow the solution to cool while adding 75 g of a 50 wt % aqueous solution of sodium hydroxide followed by addition of 1.8 g of a 35 wt % aqueous solution of hydrogen peroxide, followed by 40 g of a 50 wt % aqueous solution of sodium hydroxide. Add 18 g of deionized water to rinse.

The resulting aqueous solution is 41.92 wt % solids with a pH of 5.9, a residual acrylic acid level of 166 weight parts per million relative to total solution weight. The resulting solution (and, hence, polymer) are free of halides, particularly chloride.

The resulting cationic polymer acetate has a 1:1 mole ratio of pendant cationic functionalities to acetate. The pendant cationic functionality has the structure of Formula I where $R_1$, $R_2$ and $R_3$ all hydrogens, A is $CH_2$, B is hydrogen and C is Formula II where each of $R_4$, $R_5$ and $R_6$ are —$CH_3$ groups.

The cationic polymer acetate has a weight-average molecular weight of 16,300 daltons and a number average molecular weight of 4,200 daltons as determined by gel permeation chromatography.

Example 4: Polymerization of Example 2 to Form Cationic Polymer

Equip a round-bottom flask with an overhead stirrer, thermocouple, nitrogen bubbler, reflux condenser, syringe pumps and reciprocating pumps. Charge the flask with 137.5 g of deionized water and 1.66 g of a 0.15 wt % aqueous solution of iron (II) sulfate in deionized water. Raise the temperature to 72° C. Directly pour into the flask 0.17 g SMBS in 3.5 g deionized water. Simultaneously begin three feeds into the flask: (a) a solution of 0.57 g sodium persulfate in 15 g deionized water; (b) a solution of 6.23 g SMBS in 30 g deionized water; and (c) a mixture of 160 g glacial acrylic acid and 61.1 g of the 65.4 wt % solution of Example 2. Feed (a) into the flask over 95 minutes, (b) over 80 minutes and (c) over 90 minutes. Maintain the solution temperature in the flask at 73° C. After completing the additions, maintain the solution at 73° C. for an addition 20 minutes. Add a solution of 0.26 g sodium persulfate in 3.5 g deionized water over 10 minutes and then hold at 73° C. for another 20 minutes. Add another solution of 0.26 g sodium persulfate in 3.5 g deionized water over 10 minutes and then hold at 73° C. for another 20 minutes. Allow the solution to cool while adding 75 g of a 50 wt % aqueous solution of sodium hydroxide followed by addition of 1.9 g of a 35 wt % aqueous solution of hydrogen peroxide, followed by 40 g of a 50 wt % aqueous solution of sodium hydroxide. Add 30 g of deionized water to rinse.

The resulting aqueous solution is 40.76 wt % solids with a pH of 6.0, a residual acrylic acid level of 37 weight parts per million relative to total solution weight. The resulting solution and polymer are free of halides, particularly chloride.

The resulting cationic polymer acetate has a 1:1 mole ratio of pendant cationic functionalities to acetate. The pendant cationic functionality has the structure of Formula I where $R_1$, $R_2$ and $R_3$ all hydrogens, A is $CH_2$, B is hydrogen and C is Formula II where each of $R_4$, $R_5$ and $R_6$ are —$CH_3$ groups.

The zwitterionic polymer has a weight-average molecular weight of 20,500 daltons and a number average molecular weight of 6,500 daltons as determined by gel permeation chromatography.

The invention claimed is:

1. A method for producing a cationic polymer from a composition comprising ethylenically unsaturated quaternary ammonium cations with acetate counterions where each of the ethylenically unsaturated ammonium cations contain only one non-aromatic carbon-carbon double bond and the composition contains less than one mole-percent chloride relative to quaternary ammonium cations, the method comprising polymerizing the ethylenically unsaturated quaternary ammonium cations by free radical polymerization of the carbon-carbon double bond so as to produce a cationic polymer having quaternary ammonium pendant functionality with acetate counterions; wherein the mole ratio of ethylenically unsaturated quaternary ammonium cations to acetate anions is in a range of 1:0.9 to 1:1.1 at a pH of 8; wherein the unsaturated ammonium cations contain only one non-aromatic carbon-carbon double bond; wherein the ethylenically unsaturated quaternary ammonium cations have the structure of Formula I:

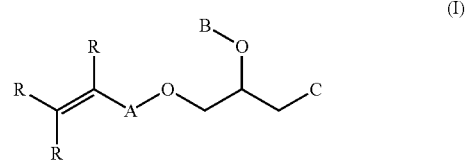

where A is $CH_2$, B is hydrogen; and C is of Formula III, where Formula III is:

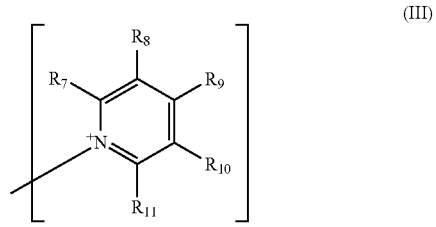

where $R_7$-$R_{11}$ are hydrogen.

2. A cationic polymer having multiple quaternary ammonium pendant functionalities with acetate counterions, wherein the quaternary ammonium pendant functionalities have a structure of that in the brackets of Formula (IV):

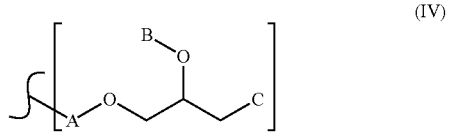

where A is $CH_2$, B is hydrogen; and C is of Formula III, where
Formula III is:

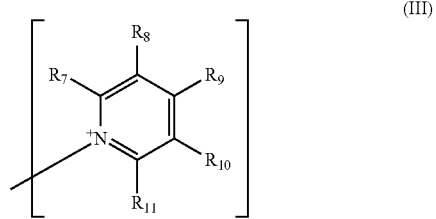

where $R_7$-$R_{11}$ are hydrogen.

3. The cationic polymer of claim 2, wherein the cationic polymer has an weight-average molecular weight between 2,000 and 100,000 Daltons as determined by gel permeation chromatography.

\* \* \* \* \*